United States Patent [19]

Kowal et al.

[11] Patent Number: 4,556,242
[45] Date of Patent: Dec. 3, 1985

[54] VIBRATION RESISTANT HIGH PRESSURE TUBE FITTING

[75] Inventors: Leonard J. Kowal, Prospect Heights; Albert J. Schwarz, Lincolnwood, both of Ill.

[73] Assignee: Imperial Clevite Inc., Glenview, Ill.

[21] Appl. No.: 555,171

[22] Filed: Nov. 25, 1983

[51] Int. Cl.⁴ ............................................. F16L 19/08
[52] U.S. Cl. ................................... 285/341; 285/382.7
[58] Field of Search ............................. 285/341, 382.7

[56] References Cited

U.S. PATENT DOCUMENTS

| | | | |
|---|---|---|---|
| 2,287,889 | 6/1942 | Krumsiek et al. | 285/382.7 X |
| 2,693,376 | 11/1954 | Wurzberger | 285/341 |
| 3,055,684 | 9/1962 | Currie | 285/382.7 X |
| 3,112,940 | 12/1963 | Crawford | 285/341 |
| 3,120,969 | 2/1964 | Schmohl | 285/341 |
| 3,174,778 | 3/1965 | Gross | 285/341 |
| 3,325,192 | 6/1967 | Sullivan | 285/341 |

FOREIGN PATENT DOCUMENTS 2080900  2/1982  United Kingdom ................. 285/341

Primary Examiner—Richard J. Scanlan, Jr.
Attorney, Agent, or Firm—Russell E. Baumann

[57] ABSTRACT

A flareless tube fitting having a nose portion defining a sharp biting edge for sealingly retaining a tube end with a body member 11 of the fitting. Vibration forces acting on the tube end outwardly of the fitting are blocked from passing to the biting edge by a rounded support outwardly of the sleeve nose portion. The rounded support is formed by a tilting of a deflectible portion of the ferrule extending outwardly from the deformable ring portion and caused to be tilted so as to urge the ring portion radially inwardly into the tube end by the threaded advance of the nut member on the body member in the makeup of the fitting.

12 Claims, 2 Drawing Figures

VIBRATION RESISTANT HIGH PRESSURE TUBE FITTING

DESCRIPTION

1. Technical Field

This invention relates to tube fittings and in particular to flareless tube fittings.

2. Background Art

In one form of known flareless tube fitting, the tube end is sealingly connected to a body member defining a through bore opening at one end through an axially outwardly widening flared camming and sealing surface. A nut member is coaxially threaded to the body member and includes an inturned flange which bears axially against a tubular sleeve to urge the nose of the sleeve against the body member camming and sealing surface so as to be constricted inwardly into the tube end. The sleeve nose is conventionally provided with a sharp edge so as to bite into the tube wall to effect both a seal between the sleeve and tube end and means for effectively preventing axial withdrawal of the tube end from the fitting upon completion of makeup thereof.

One excellent example of such a flareless tube fitting is that shown in U.S. Pat. No. 4,304,422, of Albert J. Schwarz, which patent is owned by the assignee hereof. In the Schwarz patent, the sleeve includes a frangibly connected outer portion which breaks free of the inner portion of the sleeve during makeup of the fitting. Each of the inner and outer portions has an inner end which is urged into the tube wall in the makeup of the fitting for grippingly engaging the tube end. Thus, a pair of separate sleeves is effectively formed, each of which defines a biting nose portion acting to prevent axial withdrawal of the tube end from the body member.

Another flareless fitting is illustrated in U.S. Pat. No. 2,484,815 of Cullen Crawford. Crawford teaches the use of two ferrules to provide the improved double gripping action, as well as to reduce the tendency of the tube to twist during the makeup of the fitting.

A problem arises in the use of such dual sleeve fittings in that the deformation of the noses thereof to provide a pair of comparable gripping structures is not reliably effected because of variations in groove tolerances, etc. Thus, it has been generally the practice to use such dual sleeve structures in relatively small diameter fittings where the pressure-generated forces are relatively small.

DISCLOSURE OF THE INVENTION

The present invention comprehends an improved flareless tube fitting which eliminates the disadvantages of the prior art structures in a novel and simple manner.

More specifically, it has been found that a single biting nose is adequate even in relatively high pressure fittings to provide the necessary seal and retention of the tube end in the fitting. It has been found that this structure provides such functioning as long as it is not subjected to cyclical loading, such as vibrations. As most tube fittings are subjected to vibrations in the use thereof, it has been found desirable to provide such dual sleeve fittings in the past to avoid release of the tube end under such conditions.

The present invention comprehends an improved fitting which utilizes a single biting action nose structure in combination with a vibration isolating structure at the outer end of the sleeve effectively blocking transmission of vibration forces along the tube to the biting nose.

More specifically, the invention comprehends the provision of means at the outer end of the sleeve for providing an annular support of the tube end axially outwardly of the biting nose to provide the desired vibration force locking action.

In the illustrated embodiment, the support means is defined by a radially thin deformable ring portion formed integrally in the sleeve.

In the illustrated embodiment, the ring portion is urged radially inwardly into the tube end by a force receiving element tiltably connected thereto.

In the illustrated embodiment, the force receiving element comprises an annular, radially outwardly elongated portion of the sleeve.

In the illustrated embodiment, the nut member is provided with means for limiting the radially outward displacement of the force receiving element during the tilting thereof during makeup of the fitting.

More specifically, in the illustrated embodiment, the sealing and gripping means of the present invention includes an annular sleeve defining a through bore having an axially inner nose having a frustoconical outwardly widening radially outer surface and a distal axially and radially inner annular biting edge adapted to sealingly bite into and grip the outer surface of a tube end received in the bore end as an incident of urging of the sleeve axially inwardly by the nut against the camming and sealing surface, a radially outwardly opening groove axially outwardly of the nose defined by an axially inner surface, an axially outer frustoconical outwardly widening surface, and a radially inner bottom portion defining with the through bore of the sleeve a radially thin, deformable ring portion, an axially outer deflectible portion defined by a distal frustoconical axially outwardly widening end surface and the groove outer surface, and an inwardly facing, frustoconical outwardly narrowing force transfer surface on the nut member confronting the distal end surface of the sleeve for turning, as an incident of forcible urging of the nut member toward the body member, the axially outer deflectible portion of the sleeve axially inwardly about the ring portion to an arrangement wherein the distal end surface of the sleeve is in facial engagement with the force transfer surface with the groove inner and outer surfaces in axially spaced relationship, and urging the ring portion radially inwardly into the tube end to define a support of the tube end effectively blocking transmission of vibration forces axially inwardly along the tube to the sleeve nose biting into the tube end, thereby preventing loss of the sealing and gripping action of the sleeve nose relative to the tube end notwithstanding subjection of the tube end to vibration forces axially outwardly of the support.

In the illustrated embodiment, the angle of the frustoconical groove outer surface to the sleeve axis is smaller than the angle of the frustoconical distal end surface of the sleeve, and the groove bottom is right circularly cylindrical.

In the illustrated embodiment, the groove axially inner surface is planar.

The ring portion defines a radially inner rounded surface, which is swaged into the tube end as an incident of the forcible urging of the ring portion radially inwardly.

Further illustratively, the improved sealing and gripping means of the present invention comprises an annular sleeve defining a through bore having an axially inner nose having a frustoconical outwardly widening radially outer surface and a distal axially and radially inner annular biting edge adapted to sealingly bite into and grip the outer surface of a tube end received in the bore end as an incident of urging of the sleeve axially inwardly by the nut against the camming and sealing surface, an axially outer annular tube support defined by a distal axially outwardly facing end surface, a radially thin, deformable connecting ring portion connecting the tube support to the sleeve, and an inwardly facing force transfer surface on the nut member confronting the distal end surface of the sleeve and defining means for turning, as an incident of forcible urging of the nut member toward the body member, the axially outer deflectible portion of the sleeve axially inwardly about the ring portion to an arrangement wherein the distal end surface of the sleeve is in facial engagement with the force transfer surface, the ring portion being urged radially inwardly into the tube end to define a rounded support of the tube end by the nut member effectively blocking transmission of vibration forces axially inwardly along the tube to the sleeve nose biting into the tube end, thereby preventing loss of the sealing and gripping action of the sleeve nose relative to the tube end notwithstanding subjection of the tube end to vibration forces axially outwardly of the support.

In the illustrated embodiment, the tube support comprises an axially thick annular flange inclined radially and axially outwardly from the connecting ring portion.

In the illustrated embodiment, the tube support and nut members define cooperating confronting surfaces for limiting the radially outward displacement of the support as it is turned about the connecting ring portion.

Still further illustratively, the improved sealing and gripping means of the present invention is defined by an annular sleeve defining a through bore having an axially inner nose having a frustoconical outwardly widening radially outer surface and a distal axially and radially inner annular biting edge adapted to sealingly bite into and grip the outer surface of a tube end received in the bore end as an incident of urging of the sleeve axially inwardly by the nut against the camming and sealing surface, a radially inner, thin deformable ring portion and an axially outer deflectible portion extending axially and radially outwardly from the ring portion and being defined by a distal frustoconical axially outwardly widening end surface and a radially outer end, and an axially inwardly facing, frustoconical outwardly narrowing force transfer surface on the nut member confronting the distal end surface of the sleeve for turning, as an incident of forcible urging of the nut member toward the body member, the axially outer deflectible portion of the sleeve axially inwardly about the ring portion to a disposition wherein the deflectible sleeve portion extends substantially radially outwardly, the nut member further defining a radially inwardly facing surface abutted by the radially outer end of the sleeve deflectible portion during makeup of the fitting for urging the ring portion radially inwardly into the tube end as it is turned to define a support of the tube end effectively blocking transmission of vibration forces axially inwardly along the tube to the sleeve nose biting into the tube end, thereby preventing loss of the sealing and gripping action of the sleeve nose relative to the tube end notwithstanding subjection of the tube end to vibration forces axially outwardly of the support.

In the illustrated embodiment, the radially outer end of the sleeve deflectible portion is defined by intersecting frustoconical surfaces.

The distal end surface of the sleeve has a radial length substantially equal to the radial length of the force transfer surface of the nut member.

In the illustrated embodiment, the deflectible portion of the sleeve tapers outwardly toward the radially outer end thereof, and the ring portion defines a rounded annular swaging surface in the made-up arrangement of the fitting.

The distal end surface of the sleeve is substantially facially engaged with the nut member in the made-up arrangement of the fitting.

The flareless tube fitting of the present invention is extremely simple and economical of construction while yet providing highly improved vibration-resistant tube fitting in a novel and simple manner.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
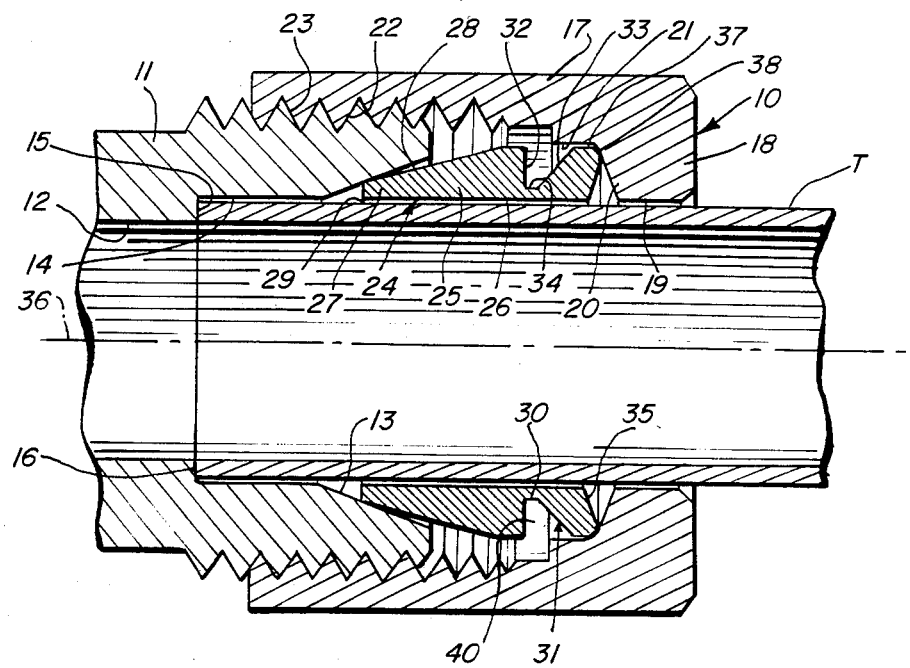
FIG. 1 is a fragmentary diametric section of a tube fitting embodying the invention for use in sealingly connecting a tube end.

In the illustrative embodiment of the invention as disclosed in the drawing, a flareless tube fitting generally designated 10 is shown for use in sealingly connecting a tube end T.

The fitting includes a body member 11 having a through bore 12 opening at an axially outer end through an axially outwardly widening flared camming and sealing surface 13.

As further shown in FIG. 1, the through bore includes a diametrically enlarged, axially outer portion 14 extending inwardly from the camming and sealing surface 13 to a radial shoulder 15. As shown, the distal end 16 of the tube T is brought into abutment with radial shoulder 15 in effecting makeup of the connection.

The fitting further includes a nut member 17 having an axially outer, radially inwardly turned flange 18 defining a through bore 19. The axially inner surface 20 of flange 18 is frustoconical, narrowing axially outwardly, terminating at its radial outer end in a right cylindrical, radially inwardly facing stop surface 21.

As further shown in FIG. 1, nut member 17 defines a female thread 22 threadedly received on a male thread 23 of body member 11.

As discussed briefly above, the invention comprehends the provision of an improved sealing and gripping ferrule for sealingly securing the tube end in the fitting. As shown in FIG. 1, the ferrule generally designated 24 comprises an annular sleeve 25 defining a through bore 26. The sleeve has an axially inner nose portion 27 defining a frustoconical, outwardly widening, radially outer surface 28 and a distal axially and radially inner annular biting edge 29 adapted to sealingly bite into and grip the outer surface of the tube end T as an incident of urging of the sleeve axially inwardly by the nut against the camming and sealing surface 13 of the body member.

Ferrule 24 further includes a radially inner, axially outer deformable ring portion 30.

Figure 2:
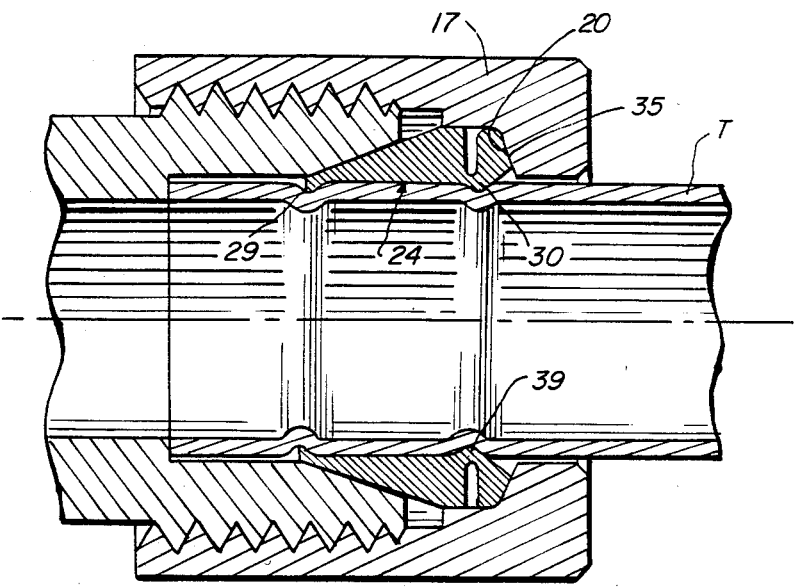
FIG. 2 is a view similar to that of FIG. 1 but with the fitting in the made-up arrangement.

Means generally designated 31 are provided for cooperation with nut flange surface 20 for initially urging the sleeve axially inwardly while concurrently urging the ring portion radially inwardly into the tube end, and subsequently effectively only urging the sleeve axially inwardly to cause the nose portion biting edge 29 to sealingly bite into the tube end while maintaining the radially inward deformation of the ring portion, as illustrated in FIG. 2 of the drawing. The resultant deformation of the ring portion defines a support of the tube end axially outwardly of the constricted nose portion biting edge for effectively blocking transmission of vibration forces axially inwardly along the tube to the biting edge 29 embedded in the tube end, thereby preventing loss of the sealing and gripping action therebetween, notwithstanding subjection of the tube end to vibration forces axially outwardly of the vibration blocking support.

More specifically as shown in FIG. 1, ferrule 24 defines a radially outwardly opening groove 40 axially outwardly of the nose portion 27. The groove is defined by an axially inner planar surface 32, an axially outer, frustoconical outwardly widening surface 33, and a radially inner bottom surface 34 defining, with the through bore 26 of the sleeve, the radially thin, deformable ring portion 30.

As shown, frustoconical surface 33 defines the axially inner surface of the urging means 31 which effectively comprises an axially outer flexible portion further defined by an axially outer frustoconical, axially outwardly widening surface 35.

In the illustrated embodiment, the angle of the frustoconical groove outer surface 33 to the sleeve axis 36 is smaller than the angle of the frustoconical distal end surface 35 of the sleeve. Further, as shown in FIG. 1, the groove bottom surface 34 is right circularly cylindrical.

More specifically, the urging means 31 defines an axially thick annular flange inclined radially and axially outwardly from the connecting ring portion 30. As shown, the radially outer end of the deflectible portion is defined by intersecting frustoconical surfaces 37 and 38. The distal end surface 35 has a radial length substantially equal to the radial length of the force transfer surface 20 of the nut member flange 18.

As illustrated in FIG. 2, axial inward threaded movement of the nut member 17 causes the force transfer surface 20 to bear against the deflectible element 31 causing it to tilt about the connecting ring portion 30 until the distal end surfaces 37 and 38 abut the stop surface 21 of the nut member and the frustoconical distal outer surface 35 is brought into facial engagement with the force transfer surface 20 of the nut member flange, thereby terminating the tilting action. The transfer of the makeup force from the nut member flange to the ferrule 24 also urges the biting edge 29 into the tube end by the constriction of the nose portion 27 as it moves against the camming and sealing surface 13 of the body member. Further, the force transfer acts to deform the ring portion 30 radially inwardly so as to define a rounded swaging surface 39 projecting into the outer surface of the tube wall. The rounded surface provides improved support of the tube end effectively blocking transmission of vibration forces axially inwardly along the tube end to the nose edge portion 29 biting into the tube end and thereby preventing loss of the sealing and gripping action of the sleeve nose relative to the tube, notwithstanding the subjection of the tube end to vibration forces axially outwardly of the support defined by the deformed rounded ring portion 30.

INDUSTRIAL APPLICABILITY

In making up of the fitting, the nut member and ferrule are successively slipped over the distal end of the tube and the tube end is brought into the body member bore portion 14 to abut the surface 15. The nut member is then threaded onto the threaded portion 23 of the body member urging the ferrule axially inwardly as a result of the force transfer surface 20 bearing against the outer end of the ferrule. The nose portion bears against the sealing and camming surface 13, as shown in FIG. 1.

As the axial force developed by the force transfer surface 20 during makeup of the fitting is initially directed against the radially outer end of the deflectible portion 31, the deflectible portion is tilted about the annular ring portion 30, causing the ring portion to deform radially inwardly. The force transferred through the ring portion to the sleeve 25 nose portion 27 causes the inward camming of the edge 29 to effect the sealing and biting engagement with the tube end. At the same time, the outer surface 28 of the sleeve nose portion is sealingly engaged with the body member surface 13 to complete the sealed connection of the tube end to the body member.

As discussed above, the support of the tube end afforded by the inwardly deformed ring portion 30 provides a vibration blocking action. As a result of the swaging action produced by the deforming ring portion 30, the outside surface of the tube end is not cut or grooved to have a sharp discontinuity, thereby effectively preventing stress concentration, or notch effect, which, in the structures of the prior art, have caused the fittings to be susceptible to fatigue failure.

Resultingly, the sealed connection of the sleeve to the tube end is effected substantially by the single sharp biting engagement of nose edge portion 29, which is effectively maintained notwithstanding vibration of the tube end by the blocking action afforded by the deformed ring portion 30.

When the makeup of the fitting reaches the arrangement of FIG. 2, the facial engagement of surfaces 20 and 35 effectively limits further collapse of the deformable ring portion 30 so that control over the deformation of the tube end in providing the vibration blocking function is automatically effected.

The foregoing disclosure of specific embodiments is illustrative of the broad inventive concepts comprehended by the invention.

We claim:

1. In a flareless tube fitting having a body member defining a through bore opening at one end through an axially outwardly widening flared camming and sealing surface for receiving an end of a tube to be connected, a nut member coaxially threaded to said body member, and a sealing and gripping ferrule comprising an annular sleeve defining a through bore, said sleeve having an axially inner nose having a frustoconical outwardly widening radially outer surface and a distal axially and radially inner annular biting edge adapted to sealingly bite into and grip the outer surface of a tube end received in said bore end as an incident of urging of the sleeve axially inwardly by the nut against said camming and sealing surface, a radially outwardly opening groove axially outwardly of said nose defined by an axially inner surface, an axially outer surface, and a radially inner bottom portion defining with the through bore of the sleeve a radially thin, deformable ring portion, an axially outer deflectible portion defined by a distal end surface and said groove outer surface, and an inwardly facing, frustoconical outwardly narrowing force transfer surface on said nut member confronting said distal end surface of the sleeve, the improvement comprising both of said axially outer surface of said groove and said axially outer deflectible portion distal end surface being frustoconical axially outwardly widening, said nut member defining a radially inwardly facing stop surface at the radially outer end of said force transfer surface, the disposition of said stop surface and the angularity of said frustoconical force transfer surface of the nut being correlated with the angularity of the frustoconical distal end surface of the sleeve for turning, as an incident of forcible urging of said nut member toward said body member, said axially outer deflectible portion of the sleeve axially inwardly about said ring portion to an arrangement wherein the distal end surface of the sleeve is in facial engagement with said force transfer surface with said groove inner and outer surfaces in axially spaced relationship, and urging said ring portion radially inwardly into the tube end as it is turned to define a rounded support of the tube end effectively blocking transmission of vibration forces axially inwardly along the tube to said sleeve nose biting into said tube end thereby preventing loss of the sealing and gripping action of the sleeve nose relative to the tube end notwithstanding subjection of the tube end to vibration forces axially outwardly of said support.

2. The tube fitting of claim 1 wherein the angle of said frustoconical groove outer surface to the sleeve axis is smaller than the angle of said frustoconical distal end surface of the sleeve.

3. The tube fitting of claim 1 wherein said groove bottom surface is right circularly cylindrical.

4. The tube fitting of claim 1 wherein said groove axially inner surface is planar.

5. The tube fitting of claim 1 wherein said ring portion defines a radially inner rounded surface as an incident of the forcible urging of the ring portion radially inwardly into the tube end.

6. The tube fitting of claim 1 wherein said deflectible portion of the sleeve comprises an axially thick annular flange.

7. The tube fitting of claim 1 wherein said deflectible portion of the sleeve comprises an axially thick annular flange inclined radially and axially outwardly of said connecting ring portion.

8. The tube fitting of claim 1 wherein said distal end of the sleeve deflectible portion is further defined by a radially outer frustoconical axially outwardly narrowing frustoconical surfaces.

9. The tube fitting of claim 1 wherein said distal end surface of the deflectible portion of the sleeve has a radial length substantially equal to the radial length of said force transfer surface of the nut member.

10. The tube fitting of claim 1 wherein said deflectible portion of the sleeve tapers outwardly toward said stop surface of the nut member.

11. The tube fitting of claim 1 wherein said distal end surface of the deflectible portion of the sleeve is substantially facially engaged with the nut member force transfer surface over its entire length.

12. The flareless tube fitting of claim 1 wherein said stop surface of the nut member comprises means for limiting radially outward displacement of said deflectible portion of the sleeve during tilting thereof by the nut member.

* * * * *